US012769018B2

(12) United States Patent
Alves Da Silva et al.

(10) Patent No.: US 12,769,018 B2
(45) Date of Patent: Oct. 20, 2026

(54) REFINEMENT STEP FOR BEAMFORMING FOR ACOUSTIC SOURCE SEPARATION

(71) Applicant: Halliburton Energy Services, Inc., Houston, TX (US)

(72) Inventors: Eduardo Alves Da Silva, Rio de Janeiro (BR); Yadong Wang, Singapore (SG); Rafael March Castaneda Neto, Rio de Janeiro (BR)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 169 days.

(21) Appl. No.: 18/748,306

(22) Filed: Jun. 20, 2024

(65) Prior Publication Data

US 2025/0389857 A1 Dec. 25, 2025

(51) Int. Cl.
*G01V 1/16* (2006.01)
*G01V 1/18* (2006.01)
(Continued)

(52) U.S. Cl.
CPC .............. *G01V 1/164* (2013.01); *G01V 1/187* (2013.01); *G01V 1/50* (2013.01); *H04R 1/326* (2013.01); *G01V 2210/34* (2013.01)

(58) Field of Classification Search
CPC .......... G01V 1/164; G01V 1/187; G01V 1/50; G01V 2210/34; G01V 1/48; G01V 2200/16; H04R 1/326
(Continued)

(56) References Cited

U.S. PATENT DOCUMENTS 10,358,597 B2 7/2019 Casey et al.
2003/0078734 A1 4/2003 Ozbek
(Continued)

FOREIGN PATENT DOCUMENTS

CN 106569181 A 4/2017

OTHER PUBLICATIONS

Nichols et al. ("Use of noise correlation matrices to interpret ocean ambient noise." The Journal of the Acoustical Society of America 145.4 (2019): 2337-2349., "Nichols") (Year: 2019).*
(Continued)

*Primary Examiner* — Yuqing Xiao
*Assistant Examiner* — Christopher Richard Walker
(74) *Attorney, Agent, or Firm* — NOVAK DRUCE CARROLL LLP

(57) ABSTRACT

Aspects of the subject technology relate to systems, methods, and computer readable media for estimating acoustic spectra. Acoustic data can be received at a hydrophone array from a first acoustic source and a second acoustic source in a downhole environment. An initial noise spatial correlation matrix estimation can be generated based on the acoustic data. The initial noise spatial correlation matrix estimation can be applied to a beamformer to generate a first source spectra estimation for the first acoustic source and the second acoustic source. A revised noise spatial correlation matrix estimation can be generated based on the first source spectra estimation. The revised noise spatial correlation matrix estimation can be applied to the beamformer to generate a second source spectra estimation for the first acoustic source and the second acoustic source in the downhole environment based on the first source spectra estimation.

20 Claims, 9 Drawing Sheets

(51) Int. Cl.
*G01V 1/50* (2006.01)
*H04R 1/32* (2006.01)

(58) Field of Classification Search
USPC .......................................................... 367/35
See application file for complete search history.

(56) References Cited

U.S. PATENT DOCUMENTS

| | | | |
|---|---|---|---|
| 2004/0223412 A1 | 11/2004 | Haldorsen | |
| 2017/0115413 A1 | 4/2017 | Wang et al. | |
| 2017/0184751 A1* | 6/2017 | Ang | G01V 1/44 |
| 2017/0269243 A1* | 9/2017 | Jagannathan | G01V 1/308 |
| 2018/0355712 A1 | 12/2018 | Nguyen et al. | |
| 2021/0238989 A1* | 8/2021 | Ang | G01M 3/243 |

OTHER PUBLICATIONS

Xu et al. ("Performance analysis of matched-field source localization under spatially correlated noise field." IEEE Journal of Oceanic Engineering 36.2 (2011): 273-284., "Xu") (Year: 2011).*
Huang et al. ("Multiple source localization in a shallow water waveguide exploiting subarray beamforming and deep neural networks." Sensors 19.21 (2019): 4768., "Huang") (Year: 2019).*
English abstract of CN106569181; retrieved from www.espacenet.com on Jun. 20, 2024.
International Search Report & Written Opinion; PCT Application No. PCT/US2024/037182; mailed Mar. 12, 2025.

* cited by examiner

REFINEMENT STEP FOR BEAMFORMING FOR ACOUSTIC SOURCE SEPARATION

TECHNICAL FIELD

The present technology pertains to acoustic logging devices for wellbore, and more specifically, to spectral separation of acoustic sources detected by acoustic logging devices in a wellbore.

BACKGROUND

Acoustic devices such as hydrophones may be deployed in a wellbore to collect sounds that may be used to characterize the downhole environment. For example, acoustic data gathered by acoustic tools can be used to identify whether it is safe to operate within a wellbore. When an acoustic tool is disposed in a wellbore, sounds, otherwise acoustic vibrations, from different sources combine when they reach the acoustic tool. In order to properly analyze the gathered acoustic data gathered from different acoustic sources, data corresponding to the acoustic vibrations generated by the different sources can be separated and processed accordingly.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DETAILED DESCRIPTION

Figure 1A:
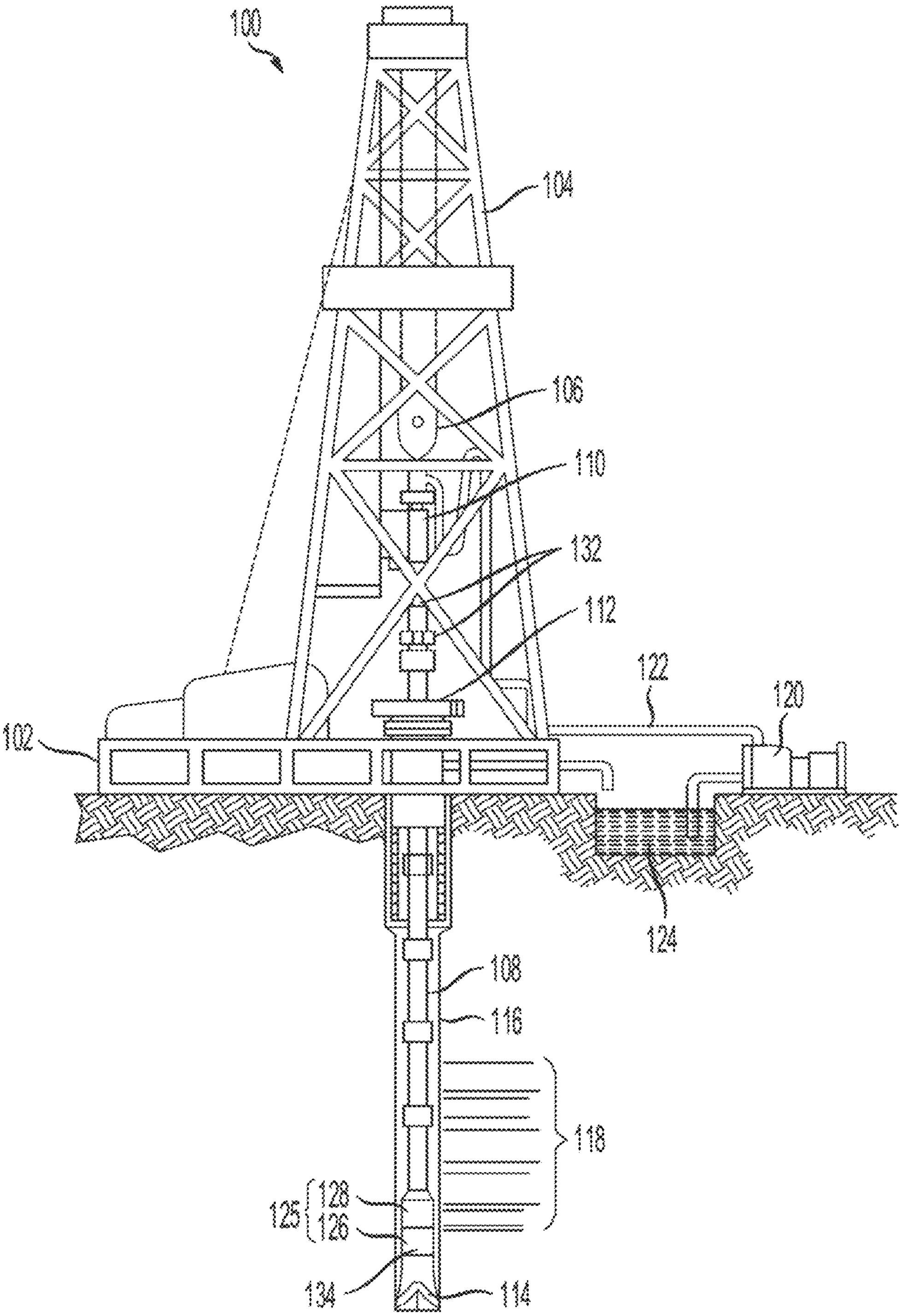
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, acoustic devices such as hydrophones may be deployed in a wellbore to collect sounds that may be used to characterize the downhole environment. For example, acoustic data gathered by acoustic tools can be used to identify whether it is safe to operate within a wellbore. When an acoustic tool is disposed in a wellbore, sounds, otherwise acoustic vibrations, from different sources combine when they reach the acoustic tool. In order to properly analyze the gathered acoustic data gathered from different acoustic sources, data corresponding to the acoustic vibrations generated by the different sources can be separated and processed to gain insight into a downhole environment.

Beamformers have been implemented to cause a hydrophone array to effectively listen to different sources distinctly by separating the spectral content from the different acoustic sources and minimizing interference between the sources. Specifically, Maximum signal-to-noise ratio (SNR) beamformers can be implemented to separate the spectra from different acoustic sources. More specifically, the Maximum SNR beamformer can be applied to suppress interferences between different acoustic sources, thereby further facilitating spectral separation capabilities.

Maximum SNR beamformers can be difficult to implement effectively. Specifically, knowledge of the signal of interest (SOI) and interference spectral variances can be relied on in effectively implementing a Maximum SNR beamformer. However, knowledge of these quantities before implementation is limited, thereby making it difficult to effectively implement Maximum SNR beamformers.

The disclosed technology addresses the foregoing by using the output of a different type of beamformer as an initial guess of the spectra of the different sources. Then, this initial guess can be used to estimate source and interference spectral variances. These estimates can then be used to implement a Maximum SNR beamformer. Then, the output of the Maximum SNR beamformer can be used to once again estimate the spectral variances and further refine the output of the Maximum SNR beamformer.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seis mic sensors, gravity sensor, image sensors, etc.) that can acquire formation data, such as characteristics of the formation, components of the formation, etc. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the acoustic tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
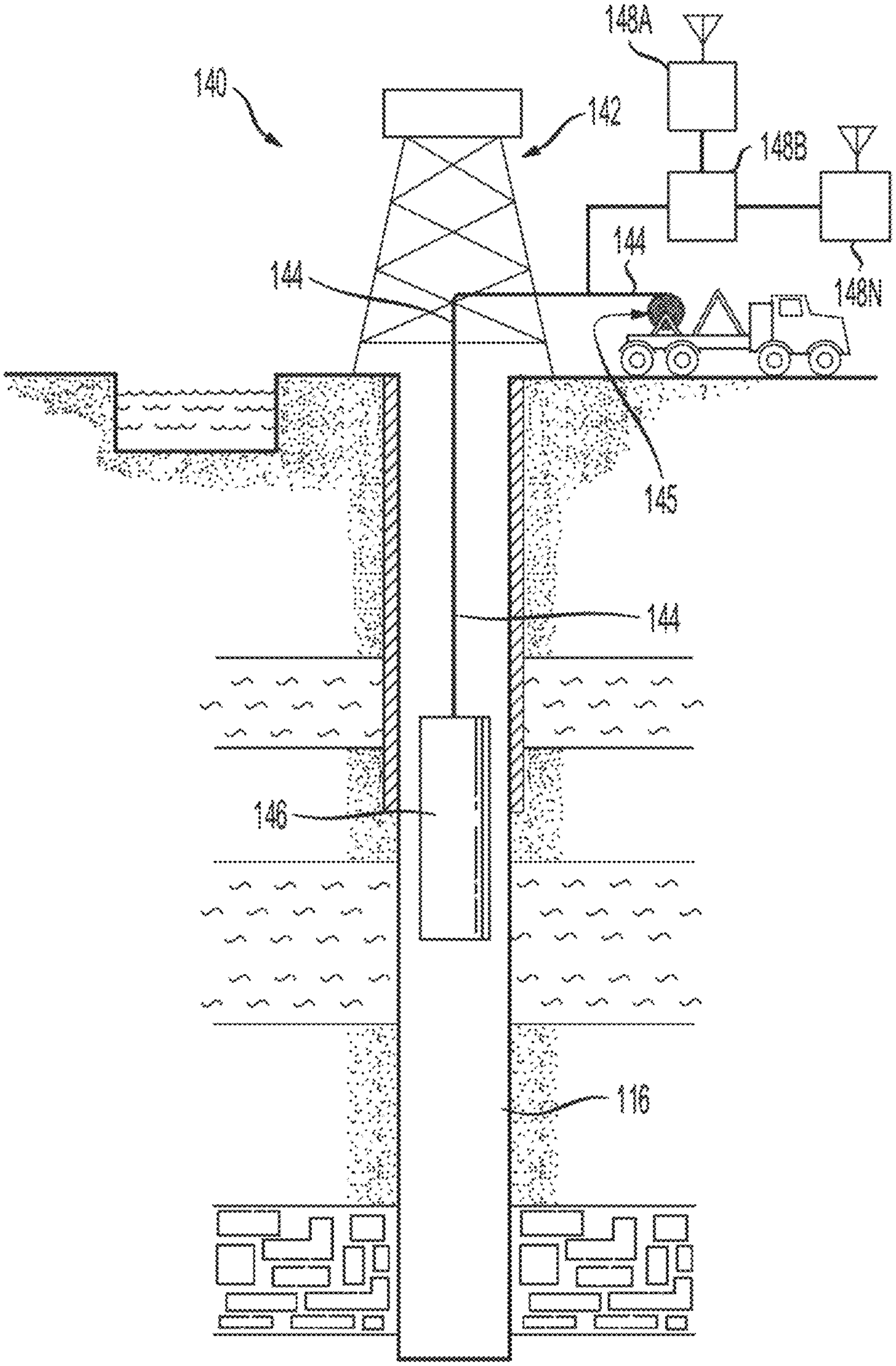
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the acoustic tools described herein.

The illustrated wireline conveyance 144 provides power and support for the tool, as well as enabling communication between data processors 148A-N on the surface. In some examples, wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via wireline conveyance 144 to meet power requirements of the tool. For slickline or coiled tubing configurations, power can be supplied downhole with a battery or via a downhole generator.

Figure 2:
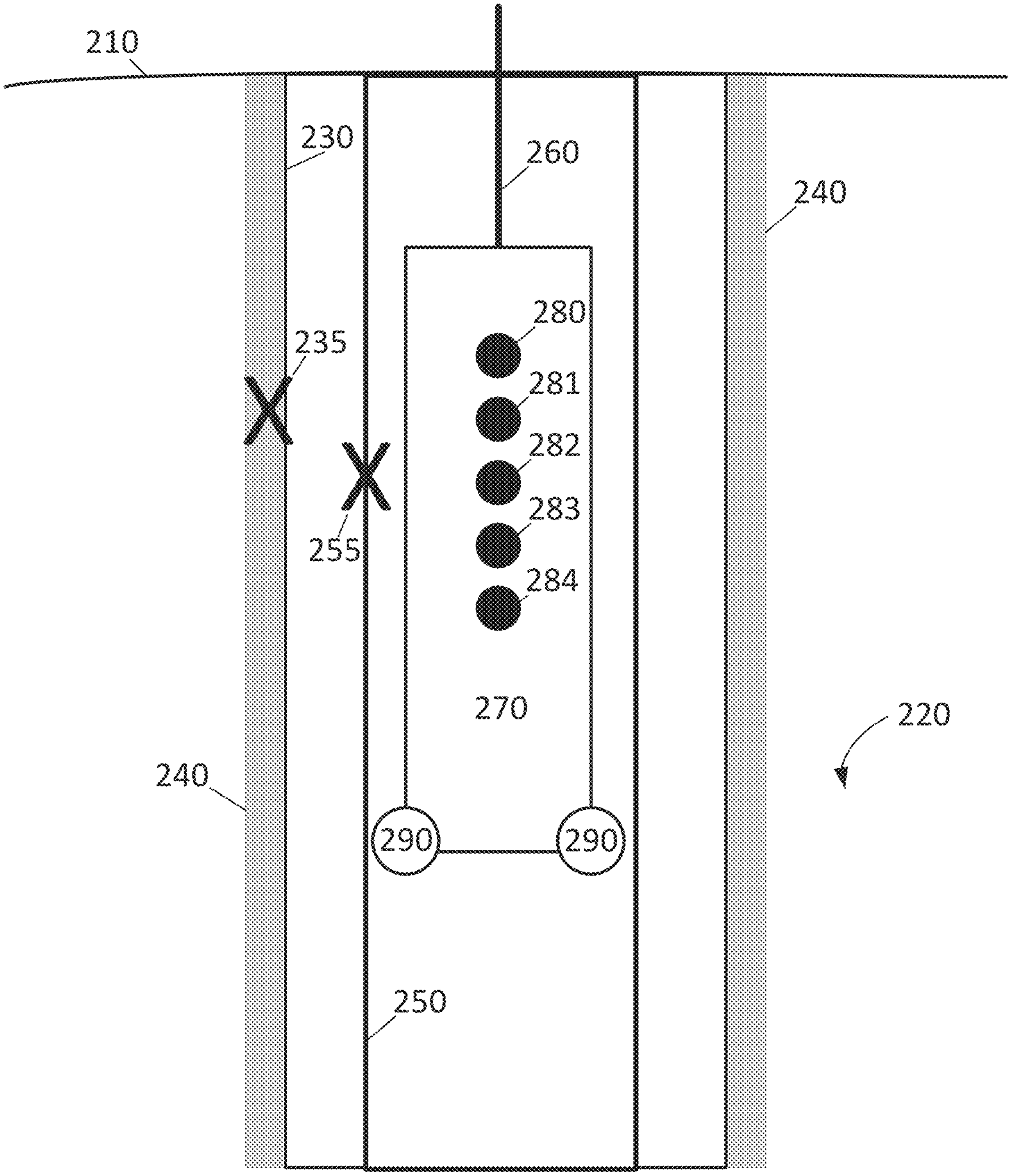
FIG. 2 illustrates a hydrophone assembly that is being deployed in a wellbore, in accordance with various aspects of the subject technology.

FIG. 2 illustrates a hydrophone assembly that is deployed in a wellbore. FIG. 2 includes casing 230 cemented into a wellbore with cement 240, tube 250 that is deployed in casing 230, and hydrophone assembly 270. Hydrophone assembly 270 includes a plurality of sensors/microphones (280, 281, 282, 283, and 284), and bumpers 290. Deployment cable 260 may be used to lower hydrophone assembly 270 into the wellbore casing 230. FIG. 2 also includes ground surface 210 and subterranean strata 220 located below the surface of the ground 210.

Sound traveling from a sound source along the tube or other structure (e.g., the casing) may travel within the wall of the tube 255 or other structure, may travel in a fluid medium adjacent to the tube or other structure, or may travel through both. When the hydrophone assembly is deployed in a wellbore, sounds sensed by sensors of the hydrophone assembly may be used to detect sounds that are associated with an applicable sound source in a downhole environment, such as a wellbore defect. Specifically, a defect (e.g., a crack) in a tube 250 (defect 255) or in a casing 230 (defect 235) of the wellbore may generate sounds as fluids leak through such defects. FIG. 2 includes two different defects, identified with X marks, a first defect 235 may be a crack in cement 240 and in casing 230, and a second defect 255 may be a crack in tube 250.

Since defect 255 is located in the middle of the sensor array, sound generated by fluids leaking through defect 255 will first be received by sensor 282, after which sensors 281 and 283 will receive the leaking sound, and then the leaking sound will be received by sensors 280 and 284. As such, some sound energy from defect 255 travels upward and some sound energy from defect 255 travels downward. Based on the position of defect 235 relative to the location of hydrophone assembly 270, leaking sounds received by the sensors of the hydrophone assembly will be received in the following order: first sensor 281 will receive the leaking sound, then sensors 280 and 282 will receive the leaking sound, next sensor 283 will receive the leaking sound, and then sensor 284 will receive the leaking sound.

In order to gain a greater understanding of the downhole environment, it is desirable to separate spectrums of audio signals that are generated from corresponding defect 255 and defect 235. This is difficult because different sensors in the hydrophone assembly 270 receive audio signals from each of the defects 255 and defect 235 at different times. Further, this is difficult because signals generated by defect 255 can interact with signals generated by defect 235, and vice versa. By separating the spectrums, e.g. through beamforming or otherwise referred to as spatial filtering, the hydrophone assembly 270 can effectively be steered to gather acoustic data for a specific point in space or region in space in the downhole environment. Specifically, the hydrophone assembly 270 can listen to audio signals from defect 255 and defect 235 separately.

Figure 3A:
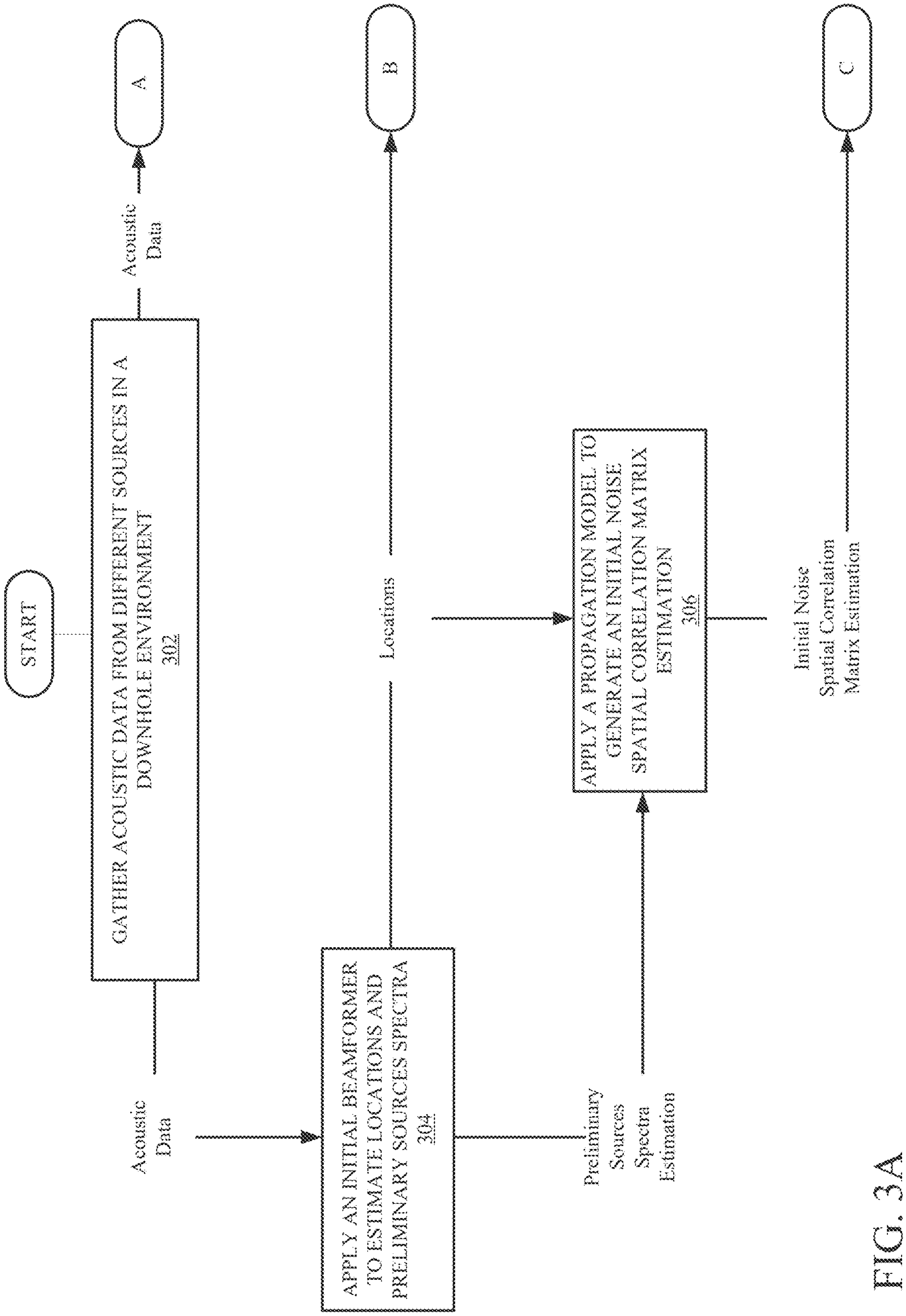
FIGS. 3A and 3B illustrate a flowchart for an example method of applying a beamformer with an initial estimate and then iteratively refining the output of the beamformer for separating source spectra, in accordance with various aspects of the subject technology.
Figure 3B:
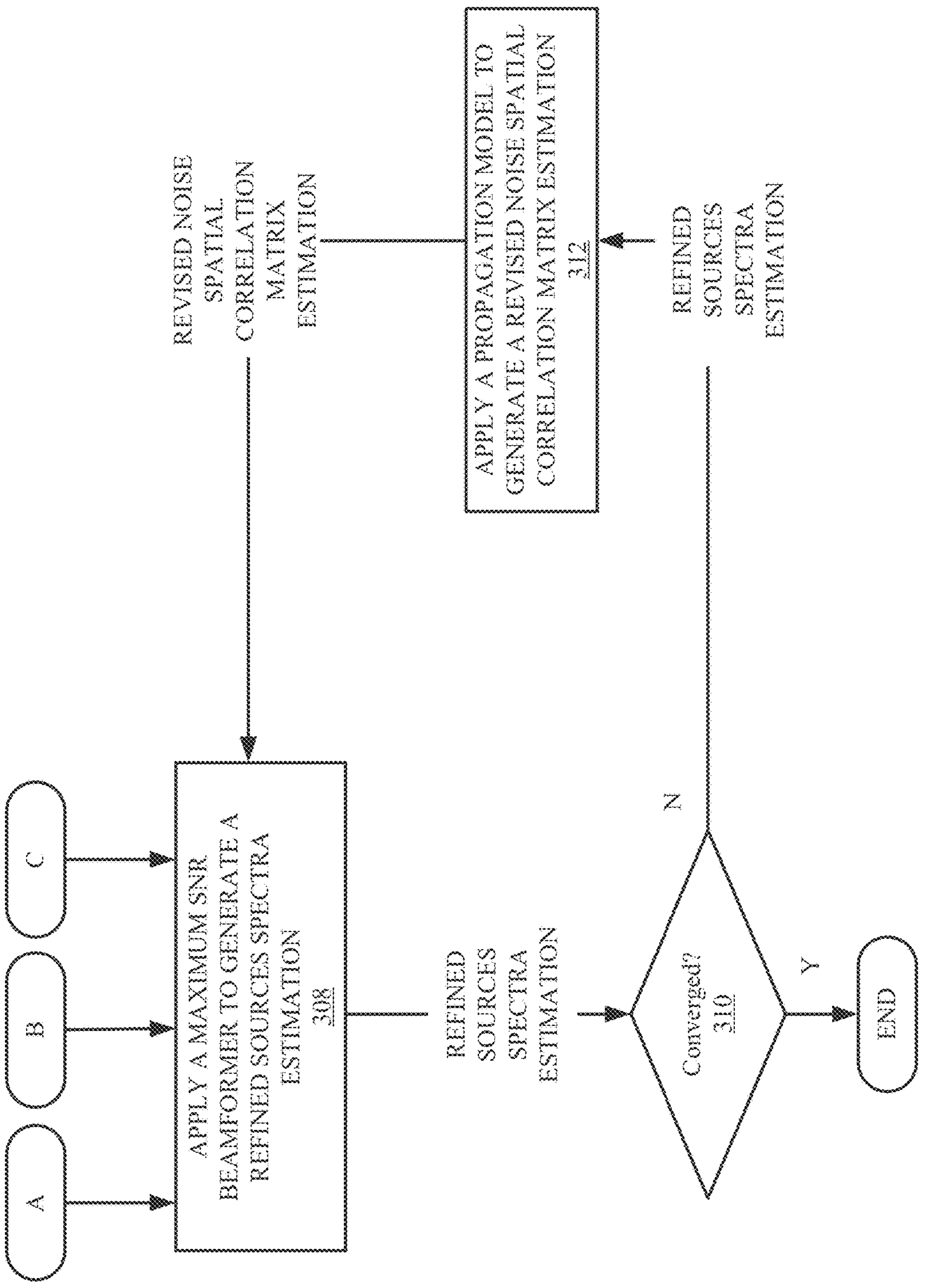

FIGS. 3A and 3B illustrate a flowchart for an example method of applying a beamformer with an initial estimate and then iteratively refining the output of the beamformer for separating source spectra. The method shown in FIGS. 3A and 3B is provided by way of example, as there are a variety of ways to carry out the method. Additionally, while the example method is illustrated with a particular order of steps, those of ordinary skill in the art will appreciate that FIGS. 3A and 3B and the modules shown therein can be executed in any order and can include fewer or more modules than illustrated. Each module shown in FIGS. 3A and 3B represents one or more steps, processes, methods or routines in the method.

At step 302, acoustic data is gathered from different sources in a downhole environment. Specifically, an array of acoustic sensors can receive acoustic signals from different sources in a downhole environment. As follows, acoustic data representing the received acoustic signals can be generated.

At step 304, an initial beamformer is applied to estimate locations of the sources. Further, at step 304, an initial beamformer is applied to generate preliminary sources spectra for the different sources. The initial beamformer can be an applicable type of beamformer for estimating locations of sources and generating a source spectra estimation. Specifically, the initial beamformer can be a different type of beamformer that is applied later. More specifically, the initial beamformer that is applied at step 304 can be a distinct type of beamformer from a Maximum SNR beamformer that will be applied later at step 308. For example, the initial beamformer applied at step 304 can be a delay & sum beamformer.

With respect to the Maximum SNR beamformer that will be applied at step 308, it can be implemented as part of a refinement loop, as will be discussed in greater detail later. Specifically, the equation for finding the weights $h_{max}$ of the Maximum SNR beamformer can be generalized by the eigenvalue Equation 1.

$$\sigma_s^2 \alpha \alpha^T h_{max} = \lambda R_{vv} h_{max} \qquad \text{Equation 1}$$

In Equation 1, $$\sigma_s^2$$

is the variance of the signal received from an acoustic source, e.g. as part of the acoustic data gathered at step 302, $\alpha$ is the steering vector, and $R_{vv}$ is the noise variance matrix. The $\lambda$ factor is the eigenvalue of the generalized problem, which can be found given the other parameters.

As discussed previously, the Maximum SNR beamformer is difficult to implement. Specifically, it can be difficult to calculate $h_{max}$, as the previously described variables are unknown. However, given $h_{max}$, an estimate of the signals from all the sources can be obtained using Equation 2.

$$\hat{s} = h_{max}^T y \qquad \text{Equation 2}$$

y is the signals from the array of acoustic sources. This estimate of the sources spectra $\hat{s}$ shown in Equation 2 can be determined by determining estimates for the previously described variables. Specifically, $$\sigma_s^2$$

and $\alpha$ can be estimated for all the sources. Then $R_{vv}$ can be determined. In determining $R_{vv}$ for a specific source, the other sources in the acoustic data can be assumed as noise. Then these parameters can be inserted into Equation 1 to determine $h_{max}$ for all the acoustic sources. As follows, $h_{max}$ for all sources can be used in Equation 2 to estimate the sources spectra s, otherwise the different spectrums for the different sources. This estimate can serve as an estimate for the parameters $\sigma_s^2$ and α and this process can be repeated.

To illustrate this technique and returning back to FIG. 3A, at step 306, the preliminary source's spectra estimation and the estimate of the locations of the sources can be fed to a propagation model to determine an initial noise spatial correlation matrix estimation. Then the initial noise spatial correlation matrix estimation can be fed to a refinement loop shown in FIG. 3B. Further, the acoustic data gathered at step 300 and the estimated locations of the sources can also be fed to the refinement loop shown in FIG. 3B.

At step 308, a Maximum SNR beamformer is applied to generate a refined sources spectra estimation. As discussed previously, the beamformer applied at step 308 is different than the beamformer applied at step 304. More specifically, the initial beamformer applied at step 304 is a beamformer that can be applied to provide a preliminary sources spectra estimation without all of the variables that are input into a Maximum SNR beamformer. For example, the initial beamformer applied at step 304 can be a Delay and Sum beamformer, Capon's beamformer, a Multiple Signal Classification (MUSIC) beamformer, or a Maximum SNR beamformer that is implemented with a simple or noninformative noise spatial correlation matrix.

At decision point 310 it is determined whether the refined sources spectra estimation generated at step 308 has converged with a previous sources spectra estimation that was used in creating input for the Maximum SNR beamformer applied at step 308. Specifically, at decision point 310 it is determined whether the refined source spectra estimation generated by the Maximum SNR beamformer has converged with the preliminary source spectra estimation that was used to create the initial noise spatial correlation matrix estimation at step 306. If it is determined that the spectra estimations have converged, then the flowchart ends. If it is determined that the spectra estimations have not converged, then the flowchart continues to step 312, as part of a refinement loop.

Convergence between estimated spectra, as used herein, can be measured through an applicable technique for measuring convergence between spectra. Specifically, convergence between estimated spectra, as used herein, can be measured based on whether differences between the estimated spectra fall within a specific, otherwise threshold amount. For example, if estimated spectra differ from each other by less than ten percent, then it can be determined that the spectra converge.

At step 312, a propagation model is applied to the refined sources spectra estimation that is generated at step 308 to generate a revised noise spatial correlation matrix estimation. In turn, the refinement loop can return back to step 308 where the revised noise spatial correlation matrix estimation, the acoustic data gathered at step 302, and the estimated locations of the sources determined at step 304 are applied to the Maximum SNR beamformer to generate a further refined source spectra estimation. Then the loop can continue back to decision point 310, where the further refined source spectra estimation is compared to the previously determined refined source spectra estimation to detect convergence. This refinement loop can continue until a suitable source spectra estimation is generated by the Maximum SNR beamformer, e.g. when the generated sources spectra estimation converges with a previously generated sources spectra estimation.

The refinement loop can also be applied to refine an estimate of the locations of the sources. Specifically, α can be re-estimated and applied by the Maximum SNR beamformer at step 308 to generate a refined sources spectra estimation. Then, α can be re-estimated based on the refined sources spectra estimation to generate a refined estimate of the locations of the sources. As follows, this refined estimate of the locations of the sources can be fed again to the Maximum SNR beamformer at step 308 to generate a further refined sources spectra estimation.

Figure 4:
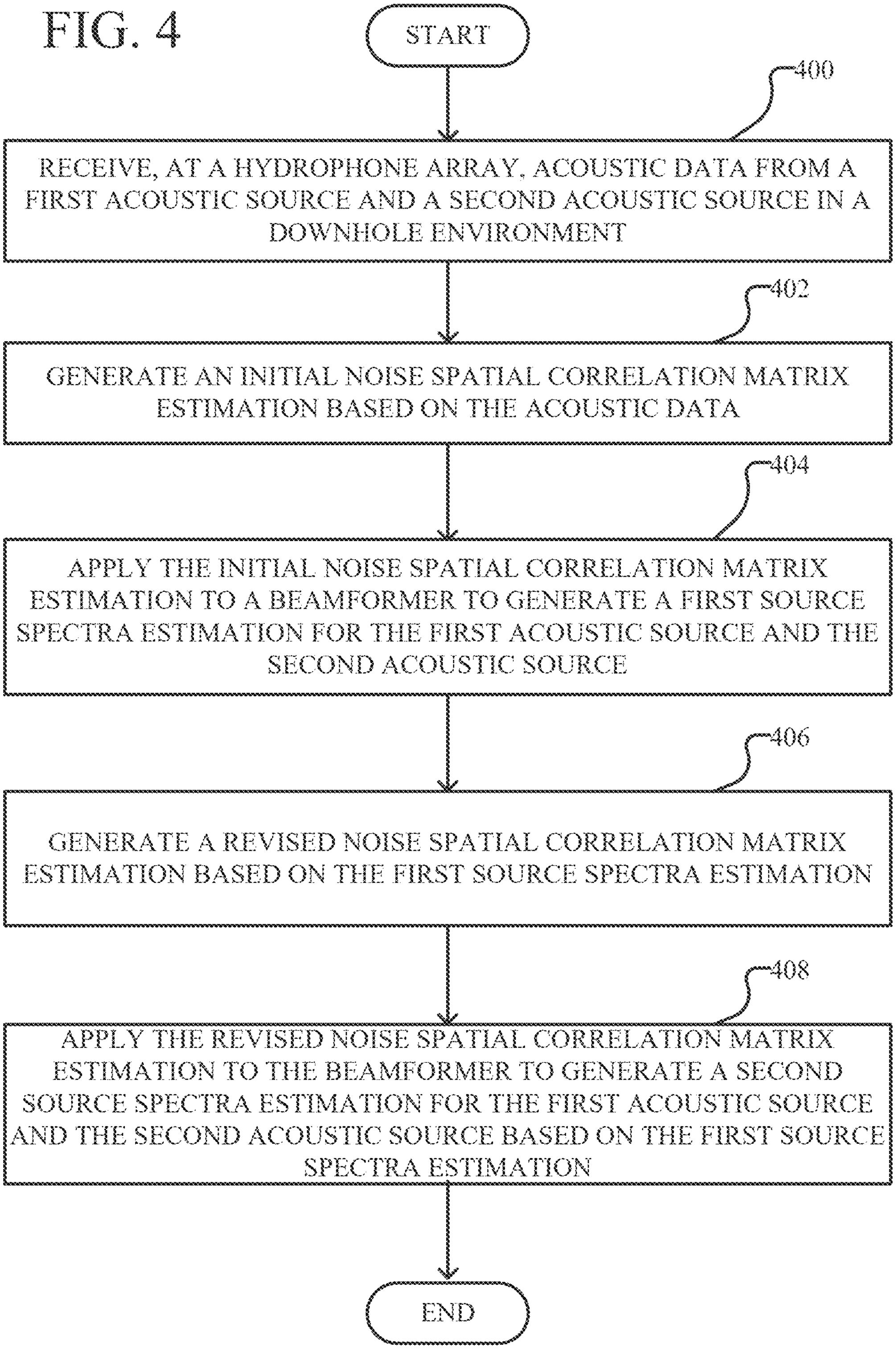
FIG. 4 illustrates a flowchart of an example method for refining the output of the beamformer for separating source spectra through a refinement loop, in accordance with various aspects of the subject technology.

FIG. 4 illustrates a flowchart of an example method for refining the output of the beamformer for separating source spectra through a refinement loop. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Each module shown in FIG. 4 represents one or more steps, processes, methods or routines in the method.

At step 400, acoustic data is received at a hydrophone array from a first acoustic source and a second acoustic source. The acoustic data can include a representation of sound that is generated by the first acoustic source and the second acoustic source and detected by the hydrophone array. The first acoustic source and the second acoustic source are at different positions relative to the hydrophone array.

At step 402, an initial noise spatial correlation matrix estimation is generated based on the acoustic data. Specifically, the acoustic data can be used to generate a preliminary sources spectra estimation. As follows, an initial noise spatial correlation matrix estimation can be generated based on the preliminary sources spectra estimation. Specifically, the initial noise spatial correlation matrix estimation can be generated by assuming the other sources are noise.

At step 404, the initial noise spatial correlation matrix estimation is applied to a Maximum SNR beamformer to generate a first source spectra estimation for the first acoustic source and the second acoustic source. The beamformer can be applied based on the acoustic data gathered at step 400. Specifically, the beamformer can be applied based on the initial noise spatial correlation matrix estimation generated from the acoustic data. Further, the beamformer can be applied based on locations of the first acoustic source and the second acoustic source that are estimated from the acoustic data.

At step 406, a revised noise spatial correlation matrix estimation is generated based on the first source spectra estimation. Specifically, first source spectra estimation can be applied to a propagation model to generate the revised noise spatial correlation matrix estimation. The revised noise spatial correlation matrix estimation can be generated based on the first source spectra estimation. Specifically, the revised noise spatial correlation matrix estimation can be generated from the first source spectra estimation based on a determination of whether the first source spectra estimation converges with a previous source spectra estimation of the first acoustic source and the second acoustic source. More specifically, the revised spatial correlation matrix estimation can be generated based on a determination that the first source spectra estimation does not converge with a previous source spectra estimation for the first acoustic source and the second acoustic source.

At step 408, the revised noise spatial correlation matrix estimation is applied to the beamformer to generate a second source spectra estimation for the first acoustic source and the second acoustic source. Specifically, the revised noise spatial correlation matrix estimation can be applied to the same Maximum SNR beamformer that was applied at step 404 to generate the first source spectra estimation. The second source spectra estimation can be generated based on the first source spectra estimation. Specifically, the second source spectra estimation can be generated based on a determination of whether the first source spectra estimation converges with a previous source spectra estimation of the first acoustic source and the second acoustic source. More specifically, the second source spectra estimation can be generated based on a determination that the first source spectra estimation does not converge with a previous source spectra estimation for the first acoustic source and the second acoustic source.

Figure 5:
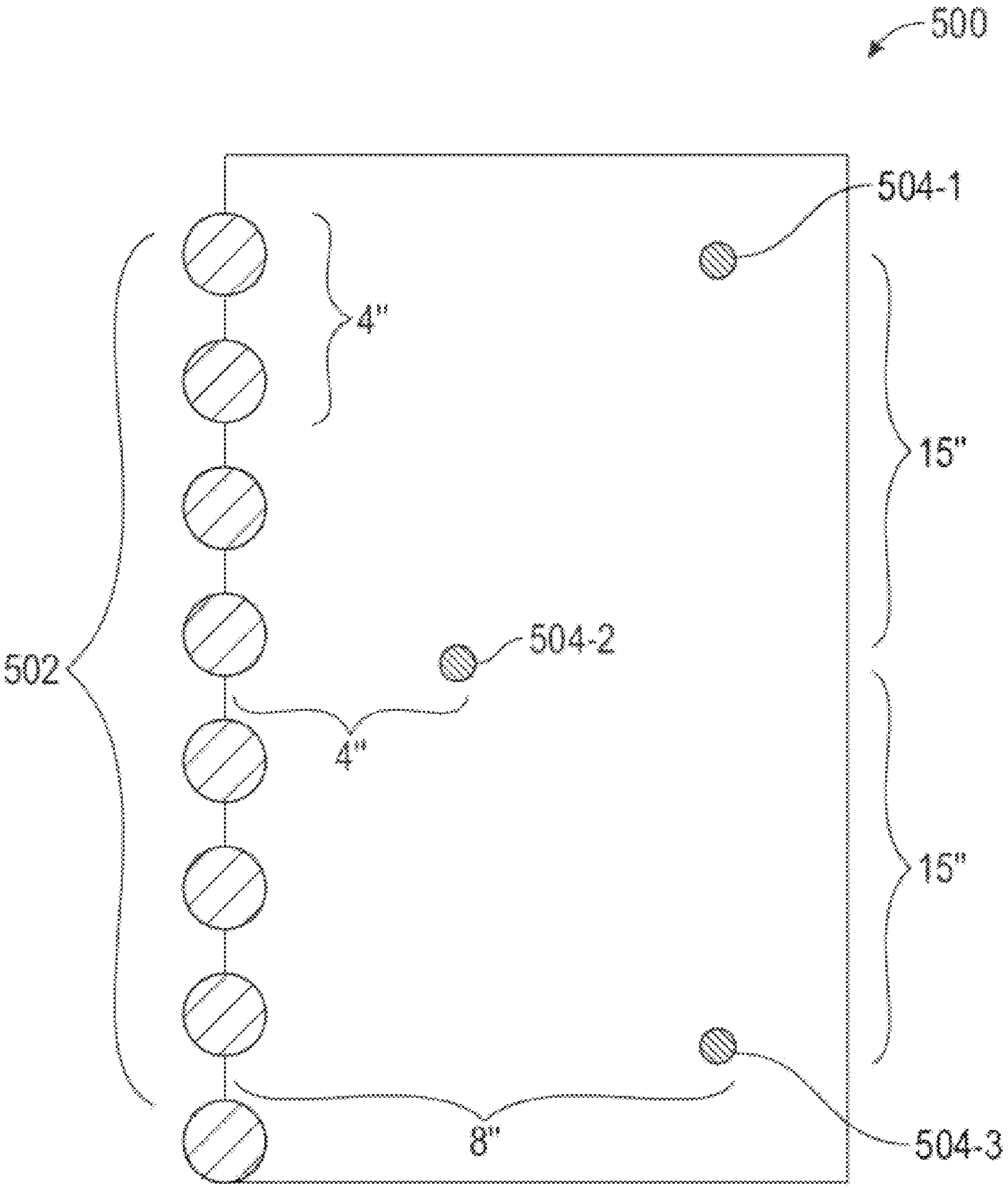
FIG. 5 illustrates a schematic diagram of a downhole environment, in accordance with various aspects of the subject technology.

FIG. 5 illustrates a schematic diagram of a downhole environment 500. The downhole environment 500 includes a hydrophone array 502. The downhole environment 500 also includes a first acoustic point source 504-1, a second acoustic point source 504-2, and a third acoustic point source 504-3 (collectively referred to as "point sources 504"). The point sources 504 can generate acoustic signals that are received by the hydrophone array 502. In turn, these acoustic signals can be processed according to the techniques described herein.

Figure 6A:
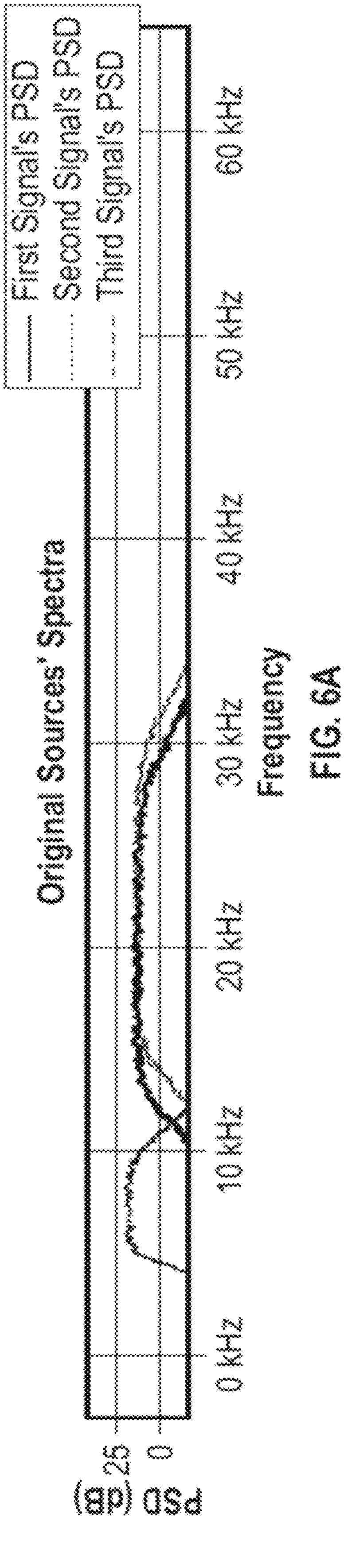
FIG. 6A illustrates a graph of spectra of a simulation of the downhole environment shown in FIG. 5, in accordance with various aspects of the subject technology.
Figure 6B:
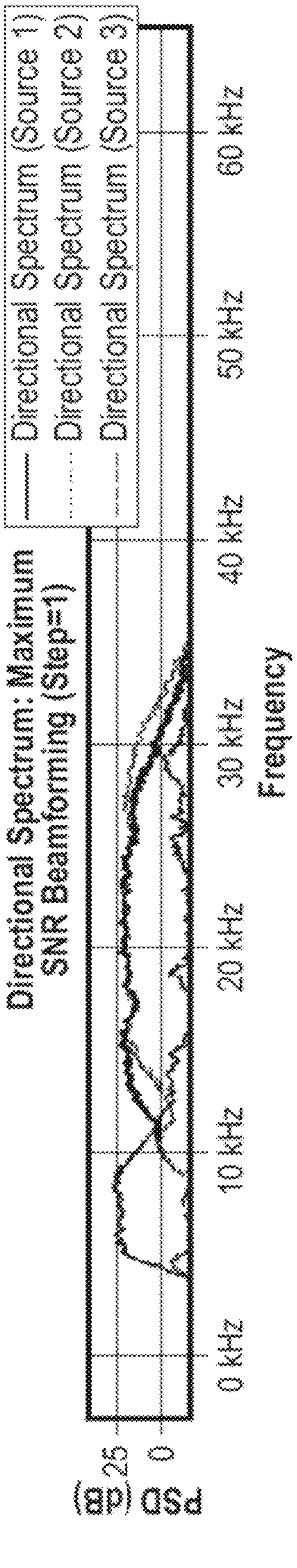
FIG. 6B illustrates a graph of an initial estimation of spectra of the sources in the downhole environment, in accordance with various aspects of the subject technology.

FIG. 6A illustrates a graph of spectra of a simulation of the downhole environment 500 shown in FIG. 5. Specifically, the graph includes spectra for the point sources shown in FIG. 5. FIG. 6B illustrates a graph of an initial estimation of spectra of the sources in the downhole environment 500. The initial estimation of spectra shown in FIG. 6B can be generated through the techniques described herein. Specifically, the initial estimation of spectra can be generated by generating an initial noise spatial correlation matrix estimate for the point sources 504 and applying the estimate to a Maximum SNR beamformer. When comparing FIG. 6B to FIG. 6A there is still a fair amount of divergence between spectra for the different sources. For example, the spectrum for the third source shows a great amount of divergence when compared to the simulated spectrum for the third source shown in FIG. 6A.

Figure 6C:
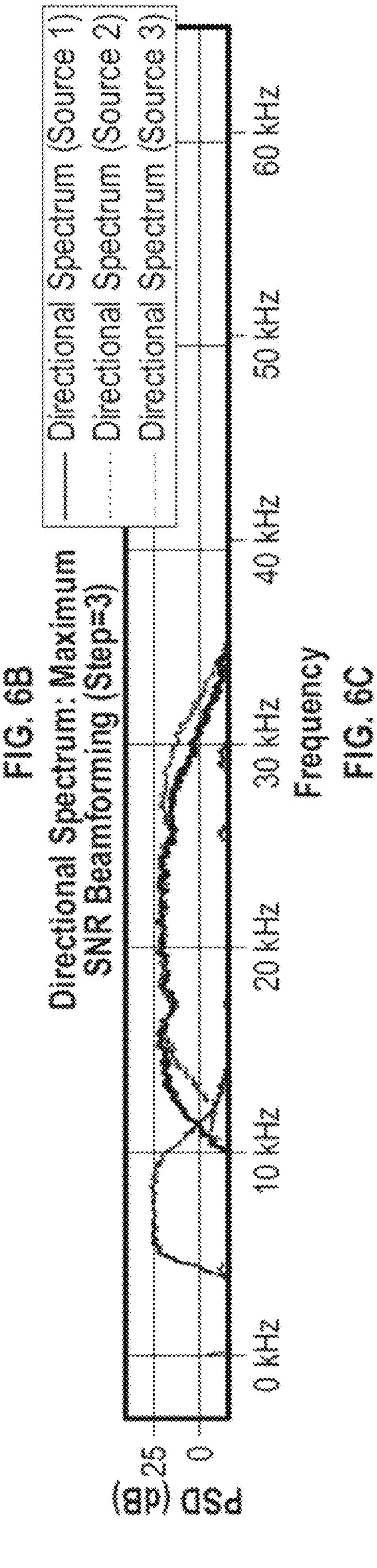
FIG. 6C illustrates a graph of a refined estimation of spectra of the sources in the downhole environment, in accordance with various aspects of the subject technology.

FIG. 6C illustrates a graph of a refined estimation of spectra of the sources in the downhole environment 500. Specifically, the refined estimation of spectra shown in FIG. 6C is generated by applying the techniques described herein with the refinement loop. More specifically, the refined estimation of spectra is generated by applying the spectra shown in FIG. 6B to generate a revised noise spatial correlation matrix. In turn, the revised noise spatial correlation matrix can be applied to a Maximum SNR beamformer to generate the refined estimation of spectra. As shown in FIG. 6C, the estimated spectra converges with the simulated spectra shown in FIG. 6A.

The technology described herein can be applied to characterize a downhole environment. Specifically, the technology described herein can be applied to identify defects in a cased wellbore. The technology can be used to characterize a downhole environment during an applicable stage, such as a well production stage and a well abandonment stage. The technology described herein can be used to characterize applicable defects in a well, such as tubing and casing leaks and cement channels. Further, the technology described herein can be used in capturing sound and characterizing producing intervals.

Figure 7:
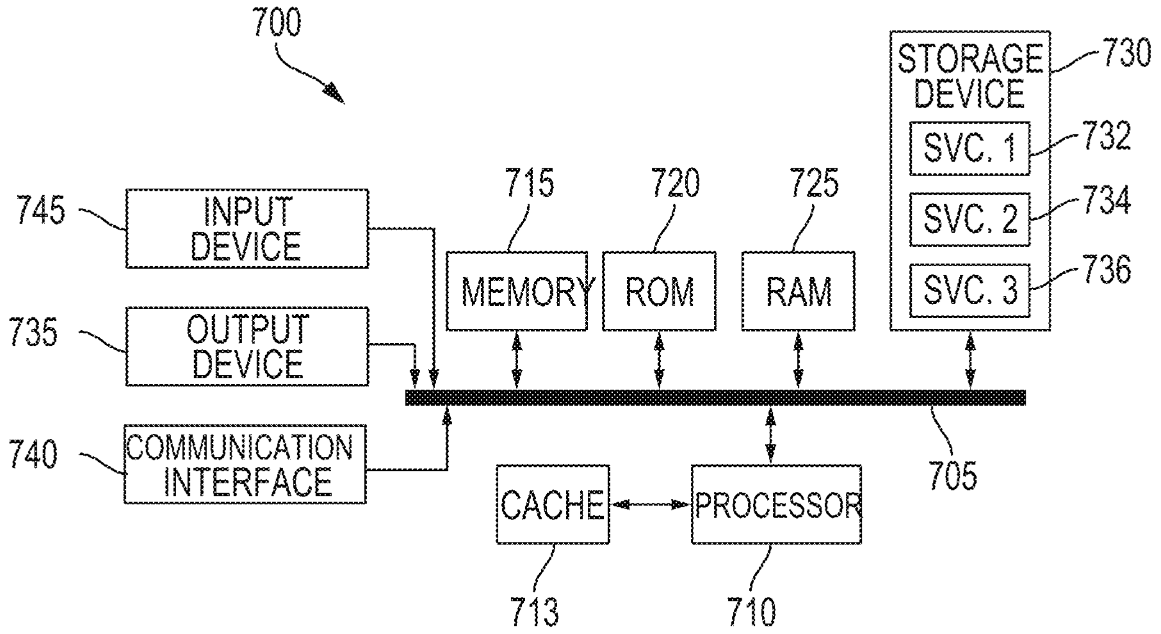
FIG. 7 illustrates an example computing device architecture which can be employed to perform various steps, methods, and techniques disclosed herein.

FIG. 7 illustrates an example computing device architecture 700 which can be employed to perform various steps, methods, and techniques disclosed herein. Further, the computing device can be configured to implement the techniques of controlling borehole image blending through machine learning described herein.

As noted above, FIG. 7 illustrates an example computing device architecture 700 of a computing device which can implement the various technologies and techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 713 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as “upper,” “upward,” “lower,” “downward,” “above,” “below,” “downhole,” “uphole,” “longitudinal,” “lateral,” and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term “coupled” is defined as connected, whether directly or indirectly through intervening components, and is not necessarily limited to physical connections. The connection can be such that the objects are permanently connected or releasably connected. The term “outside” refers to a region that is beyond the outermost confines of a physical object. The term “inside” indicates that at least a portion of a region is partially contained within a boundary formed by the object. The term “substantially” is defined to be essentially conforming to the particular dimension, shape or another word that substantially modifies, such that the component need not be exact. For example, substantially cylindrical means that the object resembles a cylinder, but can have one or more deviations from a true cylinder.

The term “radially” means substantially in a direction along a radius of the object, or having a directional component in a direction along a radius of the object, even if the object is not exactly circular or cylindrical. The term “axially” means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting “at least one of” a set indicates that one member of the set or multiple members of the set satisfy the claim. For example, claim language reciting “at least one of A and B” means A, B, or A and B.

Statements of the disclosure include:

Statement 1. A method comprising: receiving, at a hydrophone array, acoustic data from a first acoustic source and a second acoustic source in a downhole environment; generating an initial noise spatial correlation matrix estimation based on the acoustic data; applying the initial noise spatial correlation matrix estimation to a beamformer to generate a first source spectra estimation for the first acoustic source and the second acoustic source; generating a revised noise spatial correlation matrix estimation based on the first source spectra estimation; and applying the revised noise spatial correlation matrix estimation to the beamformer to generate a second source spectra estimation for the first acoustic source and the second acoustic source in the downhole environment based on the first source spectra estimation.

Statement 2. The method of statement 1, further comprising: estimating locations of the first acoustic source and the second acoustic source relative to the hydrophone array based on the acoustic data; and generating the revised noise spatial correlation matrix estimation based on the estimated locations of the first acoustic source and the second acoustic source.

Statement 3. The method of either statement 1 or 2, further comprising: generating a preliminary source spectra estimation based on the acoustic data; and generating the initial noise spatial correlation matrix estimation based on the preliminary source spectra estimation and the estimated locations of the first acoustic source and the second acoustic source.

Statement 4. The method of statement 3, wherein the initial noise spatial correlation matrix estimation is generated by applying the preliminary source spectra estimation and the estimated locations of the first acoustic source and the second acoustic source to a propagation model.

Statement 5. The method of any of statements 1 through 4, further comprising generating the preliminary source spectra estimation and the estimated locations of the first acoustic source and the second acoustic source by applying the acoustic data to a beamformer that does not use a noise spatial correlation matrix.

Statement 6. The method of any of statements 1 through 5, wherein the first source spectra estimation corresponds to the preliminary source spectra estimation, the method further comprising: determining whether the first source spectra estimation and the preliminary source spectra estimation converge; determining whether to further change the first source spectra estimation based on whether the first source spectra estimation and the preliminary source spectra estimation converge; generating the revised noise spatial correlation matrix estimation in response to a determination to further change the first source spectra estimation; and applying the revised noise spatial correlation matrix estimation to generate the second source spectra estimation in response to a determination to further change the first source spectra estimation.

Statement 7. The method of any of statements 1 through 7, further comprising: determining whether the first source spectra estimation and the second source spectra estimation converge; determining whether to further change the second source spectra estimation based on whether the first source spectra estimation and the second source spectra estimation converge; generating the revised noise spatial correlation matrix estimation in response to a determination to further change the second source spectra estimation; and applying the revised noise spatial correlation matrix estimation to generate the second source spectra estimation in response to a determination to further change the first source spectra estimation.

Statement 8. The method of statement 7, further comprising determining that the first source spectra estimation and the second source spectra estimation converge if differences between the first source spectra estimation and the second source spectra estimation are within a threshold amount.

Statement 9. The method of any of statements 1 through 8, wherein the revised noise spatial correlation matrix estimation is generated by applying the first source spectra estimation to a propagation model.

Statement 10. The method of any of statements 1 through 9, further comprising: determining an initial estimate of locations of the first acoustic source and the second acoustic source with respect to the hydrophone array; generating the first source spectra estimation based on the initial estimate of the locations of the first acoustic source and the second acoustic source with respect to the hydrophone array; determining a refined estimate of the locations of the first acoustic source and the second acoustic source with respect to the hydrophone array; and generating another source spectra estimation based on the refined estimate of the locations of the first acoustic source and the second acoustic source with respect to the hydrophone array.

Statement 11. A system comprising: one or more processors; and at least one computer-readable storage medium having stored therein instructions which, when executed by the one or more processors, cause the one or more processors to: receive, at a hydrophone array, acoustic data from a first acoustic source and a second acoustic source in a downhole environment; generate an initial noise spatial correlation matrix estimation based on the acoustic data; apply the initial noise spatial correlation matrix estimation to a beamformer to generate a first source spectra estimation for the first acoustic source and the second acoustic source; generate a revised noise spatial correlation matrix estimation based on the first source spectra estimation; and apply the revised noise spatial correlation matrix estimation to the beamformer to generate a second source spectra estimation for the first acoustic source and the second acoustic source in the downhole environment based on the first source spectra estimation.

Statement 12. The system of statement 11, wherein the instructions further cause the one or more processors to: estimate locations of the first acoustic source and the second acoustic source relative to the hydrophone array based on the acoustic data; and generate the revised noise spatial correlation matrix estimation based on the estimated locations of the first acoustic source and the second acoustic source.

Statement 13. The system of either statements 11 or 12, wherein the instructions further cause the one or more processors to: generate a preliminary source spectra estimation based on the acoustic data; and generate the initial noise spatial correlation matrix estimation based on the preliminary source spectra estimation and the estimated locations of the first acoustic source and the second acoustic source.

Statement 14. The system of statement 13, wherein the initial noise spatial correlation matrix estimation is generated by applying the preliminary source spectra estimation and the estimated locations of the first acoustic source and the second acoustic source to a propagation model.

Statement 15. The system of any of statements 11 through 14, wherein the instructions further cause the one or more processors to generate the preliminary source spectra estimation and the estimated locations of the first acoustic source and the second acoustic source by applying the acoustic data to a delay and sum beamformer.

Statement 16. The system of any of statements 1 through 15, wherein the first source spectra estimation corresponds to the preliminary source spectra estimation and wherein the instructions further cause the one or more processors to: determine whether the first source spectra estimation and the preliminary source spectra estimation converge; determine whether to further change the first source spectra estimation based on whether the first source spectra estimation and the preliminary source spectra estimation converge; generate the revised noise spatial correlation matrix estimation in response to a determination to further change the first source spectra estimation; and apply the revised noise spatial correlation matrix estimation to generate the second source spectra estimation in response to a determination to further change the first source spectra estimation.

Statement 17. The system of any of statements 1 through 16, wherein the instructions further cause the one or more processors to: determine whether the first source spectra estimation and the second source spectra estimation converge; determine whether to further change the second source spectra estimation based on whether the first source spectra estimation and the second source spectra estimation converge; generate the revised noise spatial correlation matrix estimation in response to a determination to further change the second source spectra estimation; and apply the revised noise spatial correlation matrix estimation to generate the second source spectra estimation in response to a determination to further change the first source spectra estimation.

Statement 18. The system of statement 17, wherein the instructions further cause the one or more processors to determine that the first source spectra estimation and the second source spectra estimation converge if differences between the first source spectra estimation and the second source spectra estimation are within a threshold amount.

Statement 19. The system of any of statements 11 through 18, wherein the revised noise spatial correlation matrix estimation is generated by applying the first source spectra estimation to a propagation model.

Statement 20. A non-transitory computer-readable storage medium storing instructions for causing one or more processors to: receive, at a hydrophone array, acoustic data from a first acoustic source and a second acoustic source in a downhole environment; generate an initial noise spatial correlation matrix estimation based on the acoustic data; apply the initial noise spatial correlation matrix estimation to a beamformer to generate a first source spectra estimation for the first acoustic source and the second acoustic source; generate a revised noise spatial correlation matrix estimation based on the first source spectra estimation; and apply the revised noise spatial correlation matrix estimation to the beamformer to generate a second source spectra estimation for the first acoustic source and the second acoustic source in the downhole environment based on the first source spectra estimation.

Statement 21. A system comprising means for performing a method according to any of statements 1 through 10.

What is claimed is:

1. A method comprising:

receiving, at a hydrophone array, acoustic data from a first acoustic source and a second acoustic source in a downhole environment;

applying a delay-and-sum beamformer based on the acoustic data to generate an initial spectra estimation for the first acoustic source and an initial spectra estimation for the second acoustic source as part of a preliminary source spectra estimation generated based on the acoustic data;

generating an initial noise spatial correlation matrix estimation based on the initial spectra estimation for the first acoustic source and the initial spectra estimation for the second acoustic source;

applying the initial noise spatial correlation matrix estimation to a beamformer to generate a first source spectra estimation for the first acoustic source and the second acoustic source;

generating a revised noise spatial correlation matrix estimation based on the first source spectra estimation; and applying the revised noise spatial correlation matrix estimation to the beamformer to generate a second source spectra estimation for the first acoustic source and the second acoustic source in the downhole environment based on the first source spectra estimation.

2. The method of claim 1, further comprising:

estimating locations of the first acoustic source and the second acoustic source relative to the hydrophone array based on the acoustic data; and generating the revised noise spatial correlation matrix estimation based on the estimated locations of the first acoustic source and the second acoustic source.

3. The method of claim 2, further comprising:

generating the preliminary source spectra estimation based on the acoustic data; and generating the initial noise spatial correlation matrix estimation based on the preliminary source spectra estimation and the estimated locations of the first acoustic source and the second acoustic source.

4. The method of claim 3, wherein the initial noise spatial correlation matrix estimation is generated by applying the preliminary source spectra estimation and the estimated locations of the first acoustic source and the second acoustic source to a propagation model.

5. The method of claim 3, further comprising generating the preliminary source spectra estimation and the estimated locations of the first acoustic source and the second acoustic source by applying the acoustic data to the delay-and-sum beamformer that does not use a noise spatial correlation matrix.

6. The method of claim 3, wherein the first source spectra estimation corresponds to the preliminary source spectra estimation, the method further comprising:

determining whether the first source spectra estimation and the preliminary source spectra estimation converge;

determining whether to further change the first source spectra estimation based on whether the first source spectra estimation and the preliminary source spectra estimation converge;

generating the revised noise spatial correlation matrix estimation in response to a determination to further change the first source spectra estimation; and applying the revised noise spatial correlation matrix estimation to generate the second source spectra estimation in response to a determination to further change the first source spectra estimation.

7. The method of claim 1, further comprising:

determining whether the first source spectra estimation and the second source spectra estimation converge;

determining whether to further change the second source spectra estimation based on whether the first source spectra estimation and the second source spectra estimation converge;

generating the revised noise spatial correlation matrix estimation in response to a determination to further change the second source spectra estimation; and applying the revised noise spatial correlation matrix estimation to generate the second source spectra estimation in response to a determination to further change the first source spectra estimation.

8. The method of claim 7, further comprising determining that the first source spectra estimation and the second source spectra estimation converge if differences between the first source spectra estimation and the second source spectra estimation are within a threshold amount.

9. The method of claim 1, wherein the revised noise spatial correlation matrix estimation is generated by applying the first source spectra estimation to a propagation model.

10. The method of claim 1, further comprising:

determining an initial estimate of locations of the first acoustic source and the second acoustic source with respect to the hydrophone array;

generating the first source spectra estimation based on the initial estimate of the locations of the first acoustic source and the second acoustic source with respect to the hydrophone array;

determining a refined estimate of the locations of the first acoustic source and the second acoustic source with respect to the hydrophone array; and generating another source spectra estimation based on the refined estimate of the locations of the first acoustic source and the second acoustic source with respect to the hydrophone array.

11. A system comprising:

one or more processors; and at least one computer-readable storage medium having stored therein instructions which, when executed by the one or more processors, cause the one or more processors to:

receive, at a hydrophone array, acoustic data from a first acoustic source and a second acoustic source in a downhole environment;

apply a delay-and-sum beamformer based on the acoustic data to generate an initial spectra estimation for the first acoustic source and an initial spectra estimation for the second acoustic source as part of a preliminary source spectra estimation generated based on the acoustic data;

generate an initial noise spatial correlation matrix estimation based on the initial spectra estimation for the first acoustic source and the initial spectra estimation for the second acoustic source;

apply the initial noise spatial correlation matrix estimation to a beamformer to generate a first source spectra estimation for the first acoustic source and the second acoustic source;

generate a revised noise spatial correlation matrix estimation based on the first source spectra estimation; and apply the revised noise spatial correlation matrix estimation to the beamformer to generate a second source spectra estimation for the first acoustic source and the second acoustic source in the downhole environment based on the first source spectra estimation.

12. The system of claim 11, wherein the instructions further cause the one or more processors to:

estimate locations of the first acoustic source and the second acoustic source relative to the hydrophone array based on the acoustic data; and generate the revised noise spatial correlation matrix estimation based on the estimated locations of the first acoustic source and the second acoustic source.

13. The system of claim 12, wherein the instructions further cause the one or more processors to:

generate the preliminary source spectra estimation based on the acoustic data; and generate the initial noise spatial correlation matrix estimation based on the preliminary source spectra estimation and the estimated locations of the first acoustic source and the second acoustic source.

14. The system of claim 13, wherein the initial noise spatial correlation matrix estimation is generated by applying the preliminary source spectra estimation and the estimated locations of the first acoustic source and the second acoustic source to a propagation model.

15. The system of claim 13, wherein the instructions further cause the one or more processors to generate the preliminary source spectra estimation and the estimated locations of the first acoustic source and the second acoustic source by applying the acoustic data to the delay-and-sum beamformer that does not use a noise spatial correlation matrix.

16. The system of claim 13, wherein the first source spectra estimation corresponds to the preliminary source spectra estimation and wherein the instructions further cause the one or more processors to:

determine whether the first source spectra estimation and the preliminary source spectra estimation converge;

determine whether to further change the first source spectra estimation based on whether the first source spectra estimation and the preliminary source spectra estimation converge;

generate the revised noise spatial correlation matrix estimation in response to a determination to further change the first source spectra estimation; and apply the revised noise spatial correlation matrix estimation to generate the second source spectra estimation in response to a determination to further change the first source spectra estimation.

17. The system of claim 11, wherein the instructions further cause the one or more processors to:

determine whether the first source spectra estimation and the second source spectra estimation converge;

determine whether to further change the second source spectra estimation based on whether the first source spectra estimation and the second source spectra estimation converge;

generate the revised noise spatial correlation matrix estimation in response to a determination to further change the second source spectra estimation; and apply the revised noise spatial correlation matrix estimation to generate the second source spectra estimation in response to a determination to further change the first source spectra estimation.

18. The system of claim 17, wherein the instructions further cause the one or more processors to determine that the first source spectra estimation and the second source spectra estimation converge if differences between the first source spectra estimation and the second source spectra estimation are within a threshold amount.

19. The system of claim 11, wherein the revised noise spatial correlation matrix estimation is generated by applying the first source spectra estimation to a propagation model.

20. A non-transitory computer-readable storage medium storing instructions for causing one or more processors to:

receive, at a hydrophone array, acoustic data from a first acoustic source and a second acoustic source in a downhole environment;

apply a delay-and-sum beamformer based on the acoustic data to generate an initial spectra estimation for the first acoustic source and an initial spectra estimation for the second acoustic source as part of a preliminary source spectra estimation generated based on the acoustic data;

generate an initial noise spatial correlation matrix estimation based on the initial spectra estimation for the first acoustic source and the initial spectra estimation for the second acoustic source;

apply the initial noise spatial correlation matrix estimation to a beamformer to generate a first source spectra estimation for the first acoustic source and the second acoustic source;

generate a revised noise spatial correlation matrix estimation based on the first source spectra estimation; and apply the revised noise spatial correlation matrix estimation to the beamformer to generate a second source spectra estimation for the first acoustic source and the second acoustic source in the downhole environment based on the first source spectra estimation.

* * * * *